United States Patent [19]
Cohn et al.

[11] Patent Number: 5,651,060
[45] Date of Patent: Jul. 22, 1997

[54] METHOD AND APPARATUS FOR DETECTING AND RECOVERING FROM CALL WAITING INTERRUPTIONS TO MODEM COMMUNICATIONS

[75] Inventors: Harold E. Cohn, Cupertino; Shannon A. Holland, Mountain View; Konstantin Othmer, San Jose, all of Calif.

[73] Assignee: Catapult Entertainment, Inc., Cupertino, Calif.

[21] Appl. No.: 633,846

[22] Filed: Apr. 10, 1996

Related U.S. Application Data

[63] Continuation of Ser. No. 340,122, Nov. 15, 1994, abandoned.

[51] Int. Cl.$^6$ ............................................. H04M 3/20
[52] U.S. Cl. .................. 379/215; 379/93.35; 379/209; 379/283; 463/41; 463/43
[58] Field of Search .............................. 379/215, 97, 93, 379/94, 96, 98, 201, 95, 100, 283, 209; 463/41, 43, 42

[56] References Cited

U.S. PATENT DOCUMENTS

| | | | |
|---|---|---|---|
| 4,520,477 | 5/1985 | Wen . | |
| 4,572,509 | 2/1986 | Sitrick | 463/31 |
| 4,592,546 | 6/1986 | Fascenda et al. . | |
| 4,799,635 | 1/1989 | Nakagawa . | |
| 4,852,151 | 7/1989 | Dittakavi et al. | 379/215 |
| 4,922,523 | 5/1990 | Hashimoto | 379/215 |
| 4,975,944 | 12/1990 | Cho | 379/215 |
| 4,980,897 | 12/1990 | Decker et al. . | |
| 4,995,074 | 2/1991 | Goldman et al. | 379/215 |
| 4,998,199 | 3/1991 | Tashiro et al. . | |
| 5,013,038 | 5/1991 | Luxenberg et al. . | |
| 5,048,831 | 9/1991 | Sides . | |
| 5,070,479 | 12/1991 | Nakagawa . | |
| 5,083,800 | 1/1992 | Lockton . | |
| 5,095,494 | 3/1992 | Takahashi et al. | 379/97 |
| 5,112,051 | 5/1992 | Darling et al. . | |
| 5,120,076 | 6/1992 | Luxenberg et al. . | |
| 5,155,768 | 10/1992 | Matsuhara . | |
| 5,161,803 | 11/1992 | Ohara . | |
| 5,241,587 | 8/1993 | Horton et al. | 379/97 |
| 5,263,084 | 11/1993 | Chaput et al. | 379/215 |
| 5,287,401 | 2/1994 | Lin | 379/97 |
| 5,291,189 | 3/1994 | Otake et al. . | |
| 5,292,125 | 3/1994 | Hochstein et al. . | |
| 5,350,176 | 9/1994 | Hochstein et al. . | |
| 5,369,688 | 11/1994 | Tsukamoto et al. | 379/215 |
| 5,410,541 | 4/1995 | Hotto | 379/97 |
| 5,425,092 | 6/1995 | Quirk | 379/97 |
| 5,432,616 | 7/1995 | Fukao et al. | 379/215 |
| 5,513,251 | 4/1996 | Rochkind et al. | 379/93 |
| 5,558,339 | 9/1996 | Perlman | 463/42 |
| 5,586,257 | 12/1996 | Perlman | 463/42 |

FOREIGN PATENT DOCUMENTS

| | | |
|---|---|---|
| 402067 | 6/1990 | European Pat. Off. . |
| 481770 | 10/1991 | European Pat. Off. . |
| 571138 | 5/1993 | European Pat. Off. . |
| 571213 | 5/1993 | European Pat. Off. . |
| WO9323125 | 11/1993 | WIPO . |

*Primary Examiner*—Krista M. Zele
*Assistant Examiner*—Scott Wolinsky

[57] ABSTRACT

A method and apparatus for detecting and recovering from call waiting interference to data communications is disclosed. In a system wherein a first party communicates with a second party via a telecommunications link, the telecommunications link may be disrupted by a third party's attempt to call the first or second party. The present invention detects such a disturbance on the telecommunications line and allows the first or second party to answer the call from the third party. The invention re-establishes communications after the call with the third party is completed.

5 Claims, 8 Drawing Sheets

METHOD AND APPARATUS FOR DETECTING AND RECOVERING FROM CALL WAITING INTERRUPTIONS TO MODEM COMMUNICATIONS

This application is a continuation of application Ser. No. 08/340,122, filed Nov. 15, 1994, now abandoned.

FIELD OF THE INVENTION

The present invention relates to the field of telecommunications, as it relates to interactive, multi-player computer games.

REFERENCE TO RELATED PATENT APPLICATIONS

The following co-pending patent applications are related:

U.S. patent application entitled, "NETWORK ARCHITECTURE TO SUPPORT REAL-TIME VIDEO GAMES", invented by Steve Perlman, with Ser. No. 08/633,003, filed on Apr. 16, 1996.

U.S. patent application entitled, "NETWORK ARCHITECTURE TO SUPPORT MULTIPLE SITE REAL-TIME VIDEO GAMES", invented by Steve Perlman, with Ser. No. 08/238,477, issued as U.S. Pat. No. 5,586,257 on Dec. 17, 1996.

U.S. patent application entitled, "MODEM TO SUPPORT MULTIPLE SITE CALL CONFERENCED DATA COMMUNICATIONS", invented by Steve Perlman, with Ser. No. 08/238,456, filed on May 5, 1994.

U.S. patent application entitled,"NETWORK ARCHITECTURE TO SUPPORT RECORDING AND PLAYBACK OF REAL-TIME VIDEO GAMES", invented by Steve Perlman, with Ser. No. 08/238,303, issued as U.S. Pat. No. 5,558,339 on Sep. 24, 1996.

DESCRIPTION OF RELATED ART

The above referenced co-pending patent applications describe an apparatus and method for establishing a network of remote players of real-time video games over standard telephone line connections. Using the mechanisms and methods described therein, a first computer user or video game player can be linked on a telephone line or other data communications medium with a second computer system or a second game player for the purpose of playing a real-time video game across the telecommunications network. Each of the two computer systems include a modem for modulating game data onto the telephone line for transfer to the other system. Although this technique provides an effective way of remotely playing an interactive real-time video game, the use of standard telephone line equipment and services introduces some problems with use of the telephone line as a data communications medium.

Call waiting is a residential telephone service that allows an active telephone call to be interrupted if a new call comes in. A "bong" tone or signal alerts the party being called that a new caller has placed an incoming call. In response to the call waiting "bong" signal, the called party can flash (i.e., quickly depress and release) the switch hook to put the current telephone call on hold and answer the new incoming telephone call. Conventional electronic telephone interface equipment can perform the switch hook flash operation electronically. Upon completion of the second telephone call, the called party may switch back to the first party with whom the original call was interrupted. If she called party wishes to ignore the new incoming telephone call from the third party, the called party can simply ignore the "bong" signal. In this case, a second "bong" signal sounds on the telephone line to again alert the called party that a new incoming call has been received. If this "bong" signal is ignored by the called party, no connection with the incoming call is established and the "bong" signals are discontinued. The call waiting feature is a well known feature of the conventional telephone system.

Although the call waiting feature is useful for allowing a single caller to have two active incoming calls at once, the call waiting feature is very disruptive to modem communications. Specifically, the "bong" signal will produce a data communications error if the sound appears on the telephone line while two modems are communicating. Although some telephone service providers provide a means for turning off the call waiting feature, it is not always possible to do so prior to activation of any type of data communication via modem. In addition, other telephone service providers do not provide a means for disabling the call waiting feature or do not provide a means for disabling the feature for incoming calls. Thus, the call waiting feature may significantly disrupt data communications across a telephone line.

This problem is particularly significant when two video game systems are playing a real-time video game across a modem link. In this case, an. incoming telephone call from a third party that activates the call waiting "bong" signal, will disrupt game play between the first two players and thereby frustrate the enjoyment of the game. However, it is important that during a long data call that a telephone line can be interrupted for voice communication, so long as the game can be restarted.

Thus, an apparatus and method for detecting and recovering from call waiting interruptions to modem communications is needed.

SUMMARY OF THE INVENTION

The present invention is an apparatus and method for detecting and recovering from call waiting interruptions to modem communications. The system of the present invention includes a means for monitoring a telephone line for the occurrence of a "bong" signal indicating a call waiting feature activation. A series of filters are applied to the disruption on the data communications line to determine if the call waiting "bong" signal is present. If the "bong" signal is present and the first player is accepting calls, the remote video game being played by a first and second game player is interrupted while the third party telephone call activating the call waiting feature is answered. The game is suspended and each player is notified of the incoming telephone call. The system hangs up the current telephone call and answers the incoming telephone call from the third party. Upon completion of this call, the present invention again re-establishes communication with the other game player and game play is resumed from the point at which it was interrupted.

DETAILED DESCRIPTION OF THE PREFERRED EMBODIMENT

The present invention is an apparatus and method for detecting and recovering from call waiting interruptions to modem communications. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
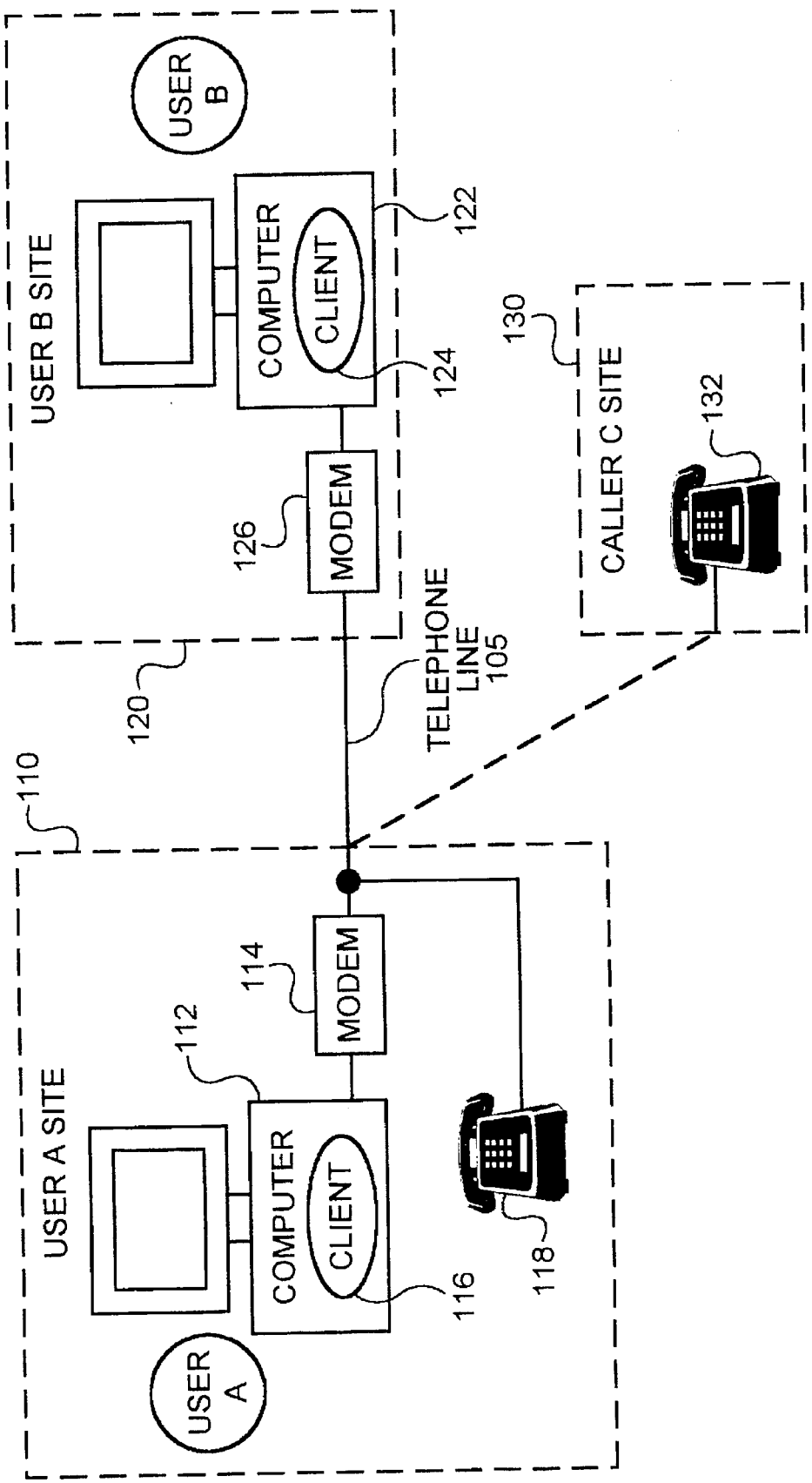
FIG. 1 illustrates a typical networked configuration wherein a third party places a call to one of the players of a remote video game.

Referring now to FIG. 1, a network configuration in which the present invention operates is illustrated. A user site 110 comprises a user A computer 112 which includes client software 114 executing therein. A modem 116 is coupled to computer 112 on one side and a telephone line 105 on the other. User site 110 may also include a standard telephone instrument 118 connected to telephone line 105. A user site B 120 comprises a similar computer system configuration including computer 122, client software 124, and modem 126. Using modems 116 and 126, user A communicates with user B over telephone line 105. In this manner, user A and user B can play a real-time video game using the techniques and methods described in the above referenced co-pending patent applications.

Communications between user A and user B are undisturbed as long as a third party does not attempt to call user A or user B at the same time modem 116 and modem 126 are communicating. If this occurs and the called party (i.e., user A or user B) has a call waiting feature on its telephone line, the call waiting feature will produce a "bong" sound on user A or user B's incoming telephone line once, and then again 10 seconds later.

Referring again to FIG. 1, FIG. 1 depicts an example of a caller C with a telephone 132 who has attempted to call user A on telephone 118 connected to telephone line 105, while user A is communicating with user B. In the examples illustrated herein, the party receiving the new incoming call (user A in the example of FIG. 1) is denoted herein as the first party. The second party herein refers to the user in communication with the first party for the purpose of playing a real-time video game (user B in the example of FIG. 1). The third party referenced herein refers to a caller or third user attempting to call the first party on the same telephone line with which the first party is communicating with the second party. In the example of FIG. 1, the third party can be either a caller with a telephone 132, at caller C site 130, or the third party can be a third computer system which comprises a computer system configuration similar to that described above for user A and user B. In both of these configurations, the third party attempts to call the first party on the same telephone line 105 with which the first party is communicating with the second party.

If the first party has a call waiting feature, the incoming call generated by the third patty will produce a "bong" signal on the incoming telephone line of the first party. Although many telephone system providers provide a means for deactivating the call waiting feature on outgoing telephone calls, it is uncommon for these telephone system providers to provide a means for disabling call waiting on incoming telephone calls. Further, it is inconvenient for a first or second party to be required to deactivate a call waiting feature on the chance that a third party might attempt to call. Unfortunately, when the first party (user A) receives the "bong" signal as a result of the third party's incoming call, the data communications with the second party (user B) will be disrupted. As a result, a data communications error will occur between the first party (user A) and the second party (user B).

Figure 2:
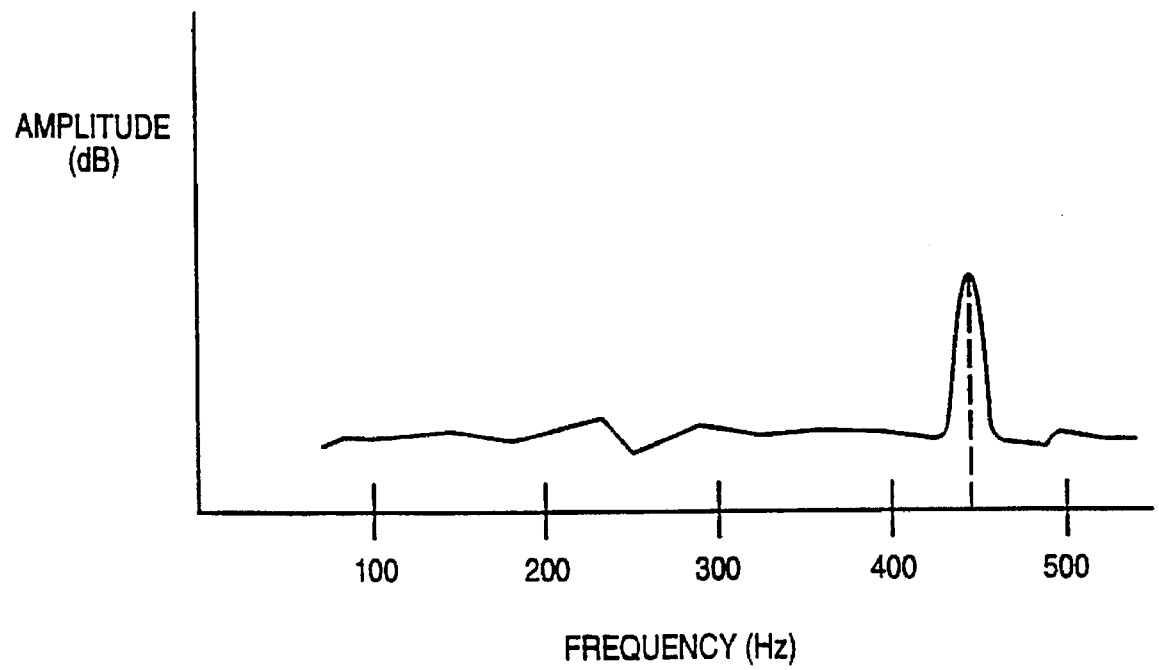
FIG. 2 is a graph illustrating the frequency of the call waiting "bong" signal.

In the present invention, a means for detecting and recovering from these call waiting interruptions is provided. Referring now to FIG. 2, a graph illustrates a frequency spectrum in which the call waiting "bong" tone or signal is easily identifiable. As well known in the art, the call waiting "bong" signal is a spike signal at 440 Hz. A series of filters are provided in the preferred embodiment for detecting the call waiting "bong" signal.

Figure 3:
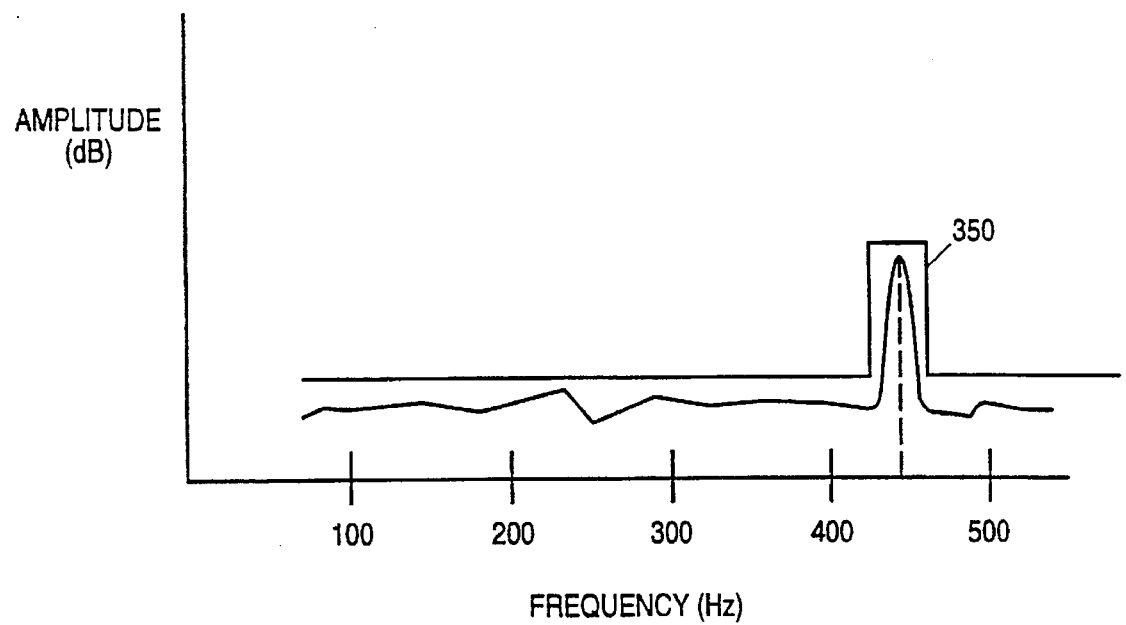
FIGS. 3 and 4 illustrate the use of likers for detecting the call waiting "bong" signal.

Referring now to FIG. 3, filter 350 is shown. Means for producing a filter such as filter 350 are well known to those of ordinary skill in the art. This filter is used to identify if energy is present at the frequency corresponding to the "bong" signal. If it is determined that a level of energy at the "bong" frequency exceeds a predetermined threshold, one additional test is performed to confirm that the "bong" signal is present or absent on the telephone line 105.

Figure 4:
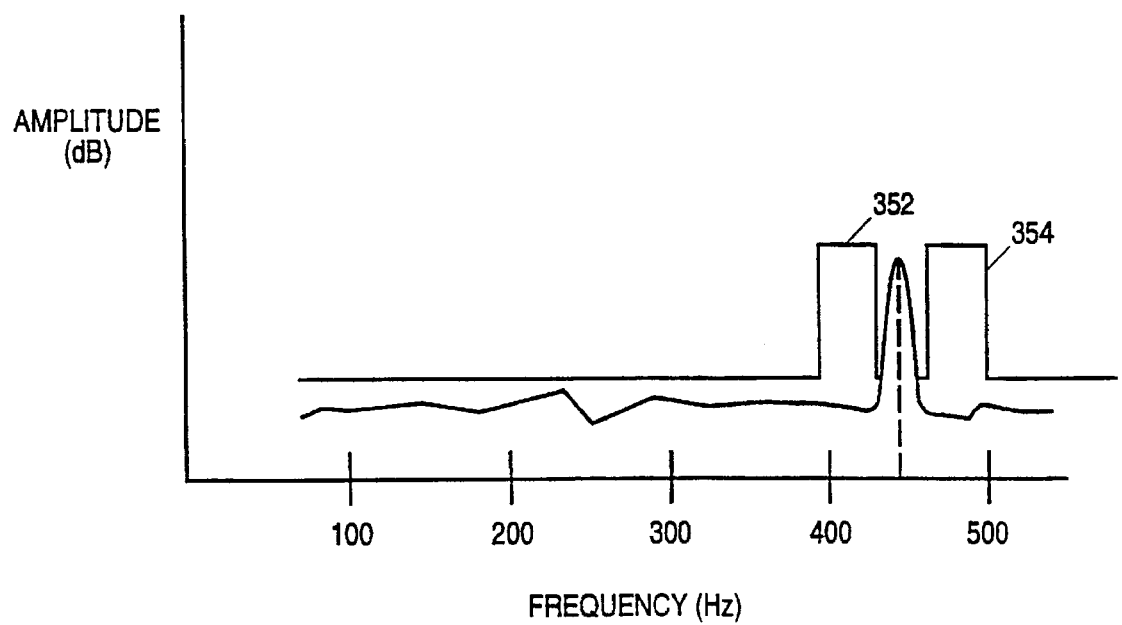

Referring now to FIG. 4, two additional filters 352 and 354 are illustrated on either side of the frequency corresponding to the "bong" signal. These filters 352 and 354 are used to determine if energy on either side of the "bong" frequency is absent thereby indicating the presence of a signal spike at the "bong" frequency. If there is no energy detected at the frequency range corresponding to filters 352 and 354 (and it is previously determined that there is energy at 440 Hz.), it is confirmed that the "bong" signal has been received on telephone line 105. Thus, the present invention detects the presence or absence of the "bong" call waiting signal on telephone line 105.

Referring now to FIGS. 5–9, flow charts illustrate the processing logic of the present invention for handling and recovering from call waiting interruptions to modem communications. This processing logic executes within the client software of each user illustrated in FIG. 1. It will be apparent to those of ordinary skill in the art that other means are possible for performing the processing steps disclosed below.

Figure 5:
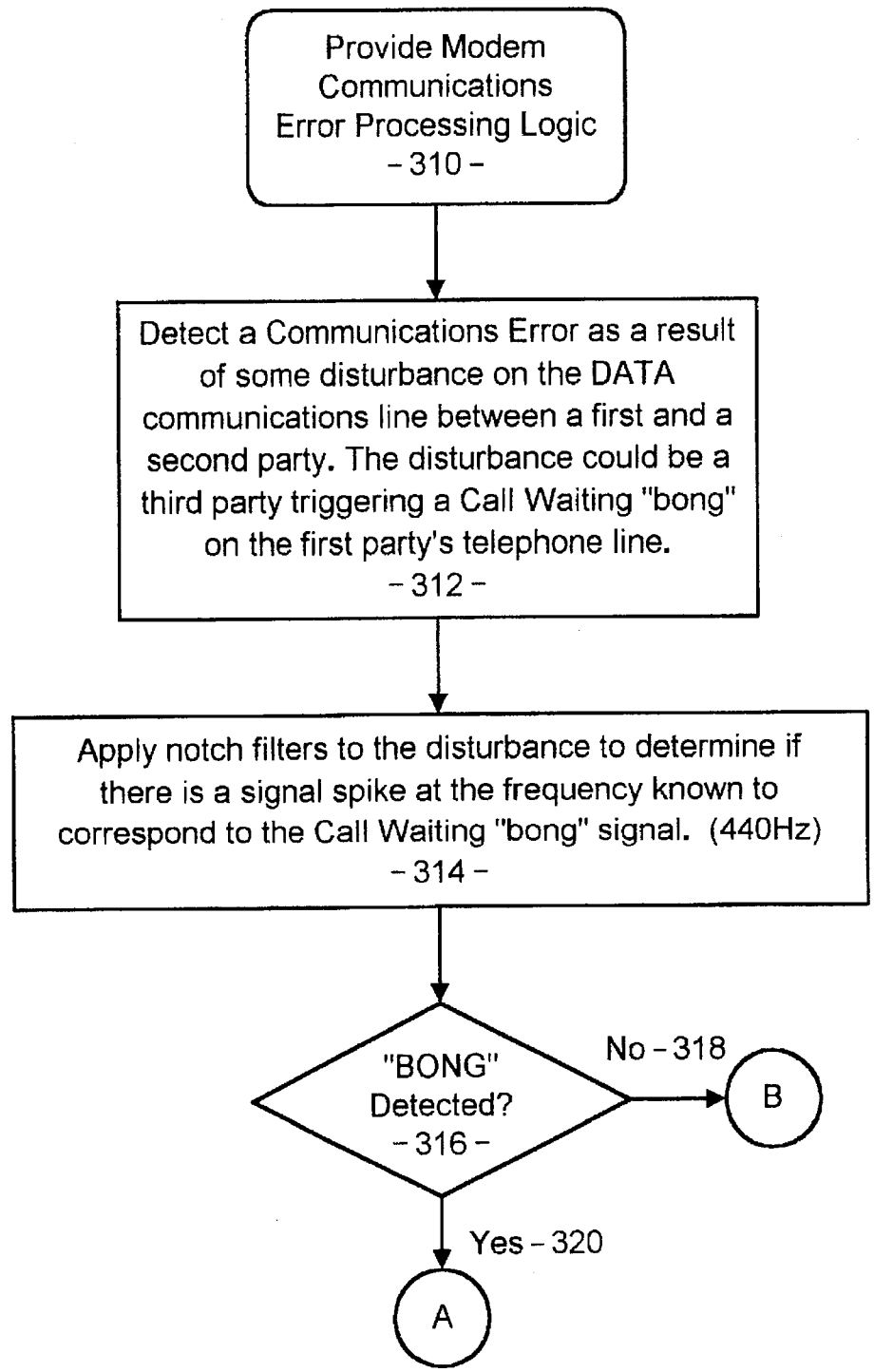
FIGS. 5–9 are flow charts illustrating the modem communications error processing logic for handling call waiting interruptions to modem communications.

Referring now to FIG. 5, the modem communications error processing logic of the preferred embodiment of the present invention is illustrated. In processing block 310, Modem Communications Error Processing Logic is provided. In processing block 312, a communication error on telephone line 105 is detected as a result of some disturbance on the data communication line between a first and a second party. The disturbance could be a third party triggering a call waiting "bong" signal on the first party's telephone line. In order to detect the presence of the call waiting "bong" signal on the telephone line, filters are applied to the disturbance to determine if there is a signal spike at the frequency corresponding to the call waiting "bong" signal (440 Hz) (processing block 314). The use of filters to detect the presence of a "bong" call waiting signal on telephone line 105 is described above in connection with FIGS. 2–4. In decision block 316, if a "bong" call waiting signal is detected on telephone line 105, processing path 320 is taken to the bubble labeled A illustrated in FIG. 6. If no "bong" signal is detected, processing path 318 is taken to the bubble labeled B illustrated in FIG. 9.

Figure 6:
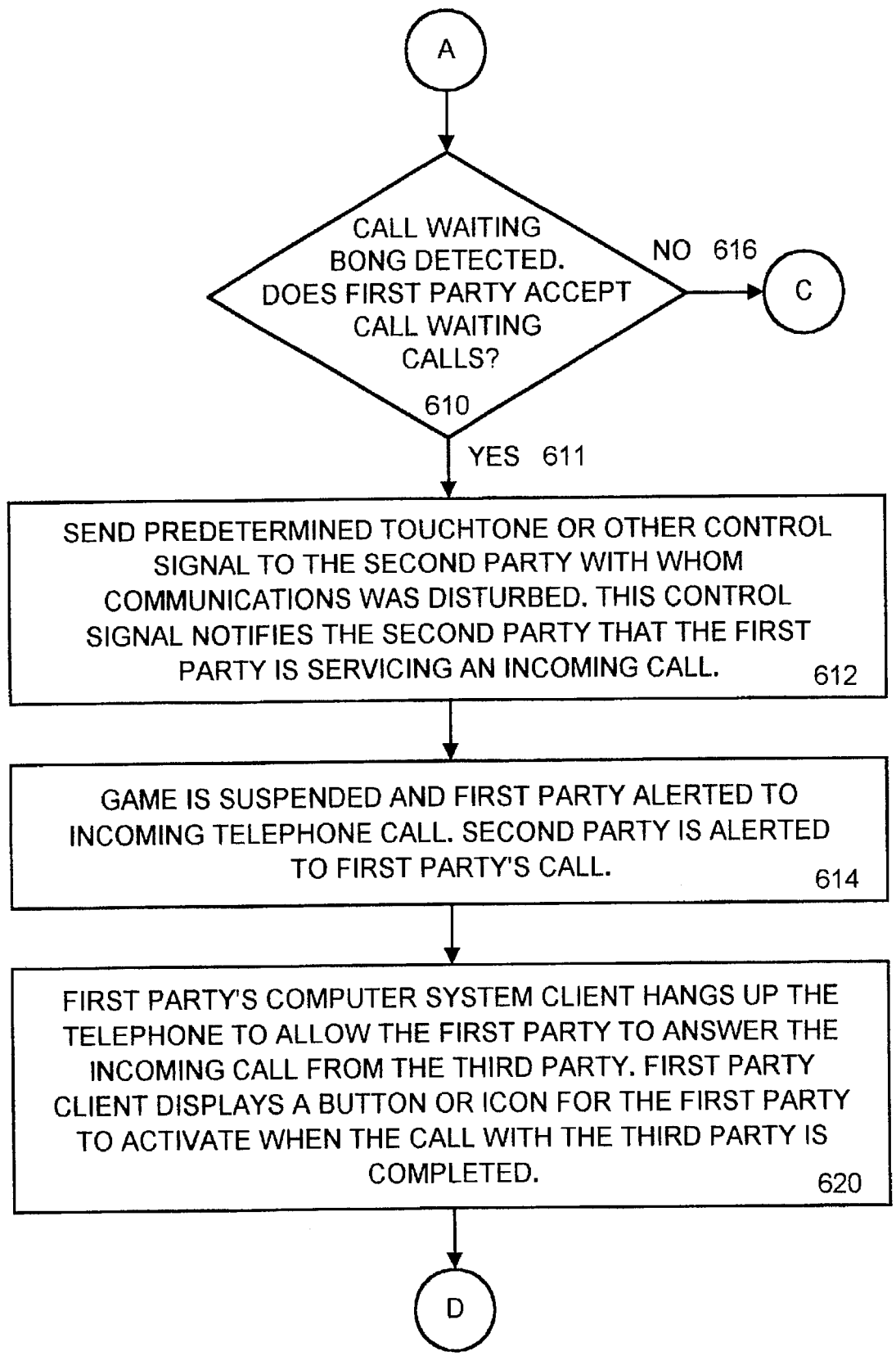

Referring now to FIG. 6, processing logic for the present invention continues when a "bong" signal is detected on telephone line 105 of the first party. In decision block 610, if first party has previously declined to be interrupted by call waiting, take path 616 to bubble C (otherwise, take decision path 611 to box 612). In this case, it is necessary to notify the second party that data communications have been disrupted as a result of the receipt of an incoming call from the third party. To so notify the second party, a predetermined touch tone signal or other control signal is sent by the first party to the second party to notify the second party that a call waiting disruption is being serviced by the first party (processing block 612). The touchtone signal is used to signal the second party that the first party has a call coming in. The particular DTMF tone is chosen carefully for two reasons. 1) to reliably disrupt the second party's modem such that the data is corrupted and the error recovery mechanisms of the present invention are activated to direct the second party modem to listen for a DTMF tone. 2) to use a tone not used by a normal telephone (there are 4 DTMF tones defined which are not available on a standard touchtone keypad) so that there is no false triggering if a person on an extension phone dials a DTMF tone. The client software in the first party's system suspends game play and alerts the first party that there is an incoming telephone call from the third party (processing block 614).

In processing block 620, the first party has requested its client software to receive the call from the third party. In this case, the first party's client system hangs up the telephone with the second party and thereby allows the first party to answer the incoming call from the third party. The first party client software displays a button or icon for the first party to activate when the call with the third party has been completed, processing then continues at the bubble labeled D illustrated in FIG. 8.

Figure 8:
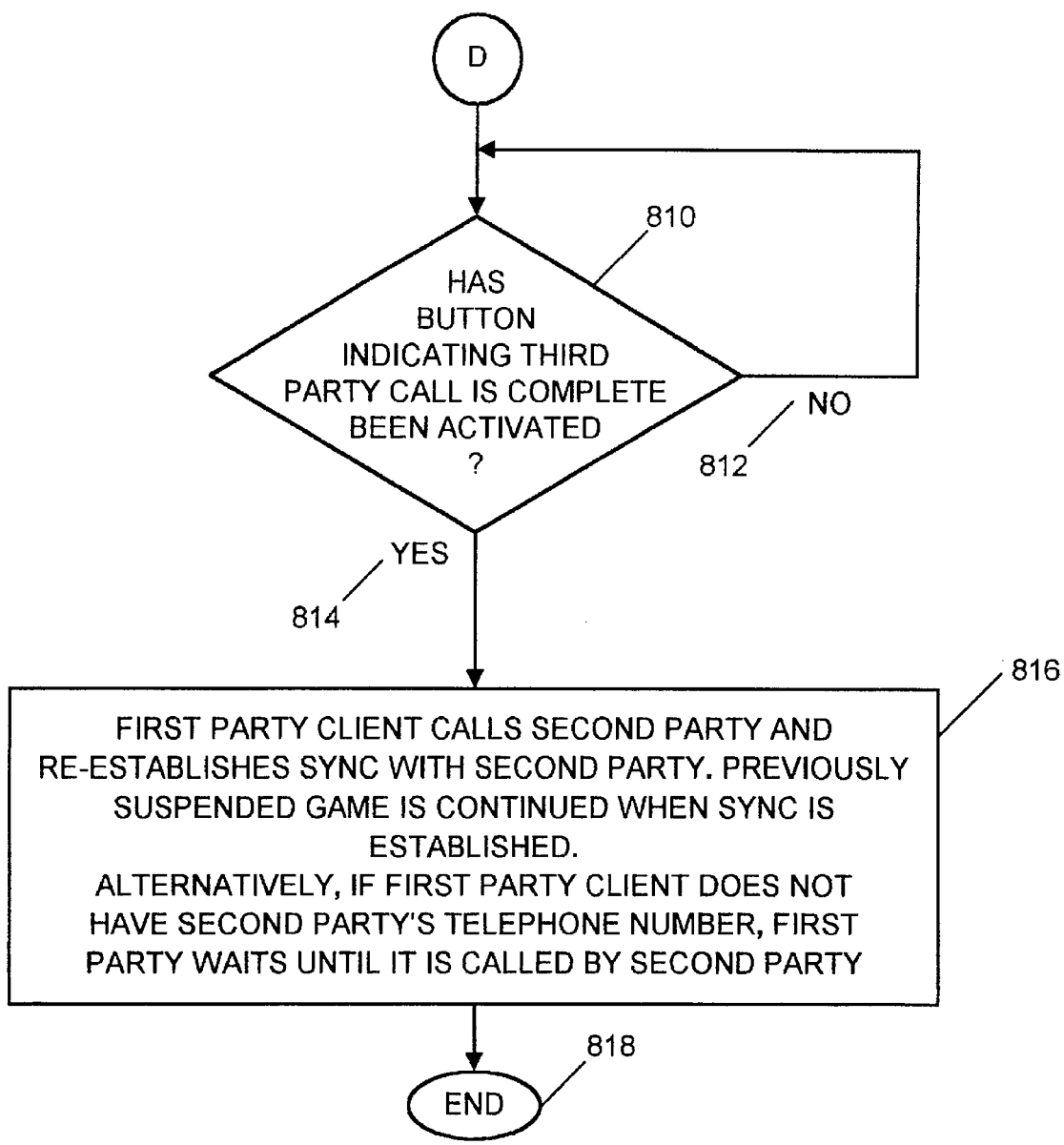

Referring now to FIG. 8, processing for answering the incoming call from the third party continues at the bubble labeled D. The conversation between the first party and the third party continues until the first party terminates the call and activates the button or icon provided by the first party client software which indicates that the first party call has been completed. If this button or icon is activated (814) by the first party thereby indicating completion of the call with the third party, decision path 810 is taken to processing block 816. Processing path 812 is taken as long as the first party has not yet completed the call with the third party.

In processing block 816, the first party has terminated the call from the third party and the first party now desires to be reconnected with the second party in order to continue the previously interrupted real-time video game. In this case, the first party client software calls the second party system and re-establishes synchronization with the second party using methods described above and in the above referenced co-pending patent applications. The previously suspended game between the first party and the second party is continued when synchronization is established. In an alternative embodiment, if the first party client software does not have the second party's telephone number, the first party simply waits until it is called by the second party at the completion of a time-out within the second party system (processing block 816). Processing for handling the third party call then terminates through end bubble 818 illustrated in FIG. 8.

Figure 7:
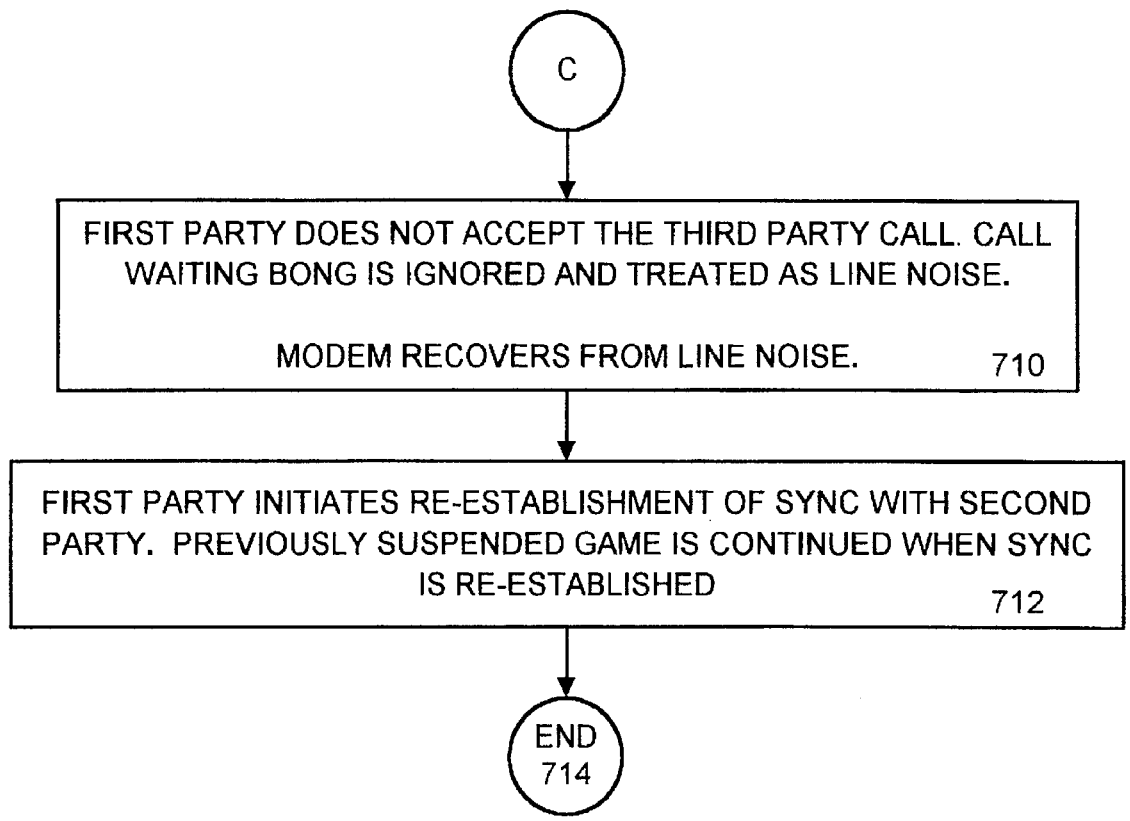

Referring to FIG. 7, processing for the present invention continues at the processing block 710 where the first party has specified a desire not to answer the call from the third party. The call waiting tone is ignored and treated as noise. The modem recovers from the noise, and then sync is re-established between the systems and game execution continues. The first party client software initiates the re-establishment of synchronization between the first and second party. Again, this procedure is described above and in connection with the above referenced co-pending patent applications. Once the synchronization between the first party and the second party is established, the previously suspended game is continued from where it left off (processing block 712). Processing for the present invention then terminates through end bubble 714.

Figure 9:
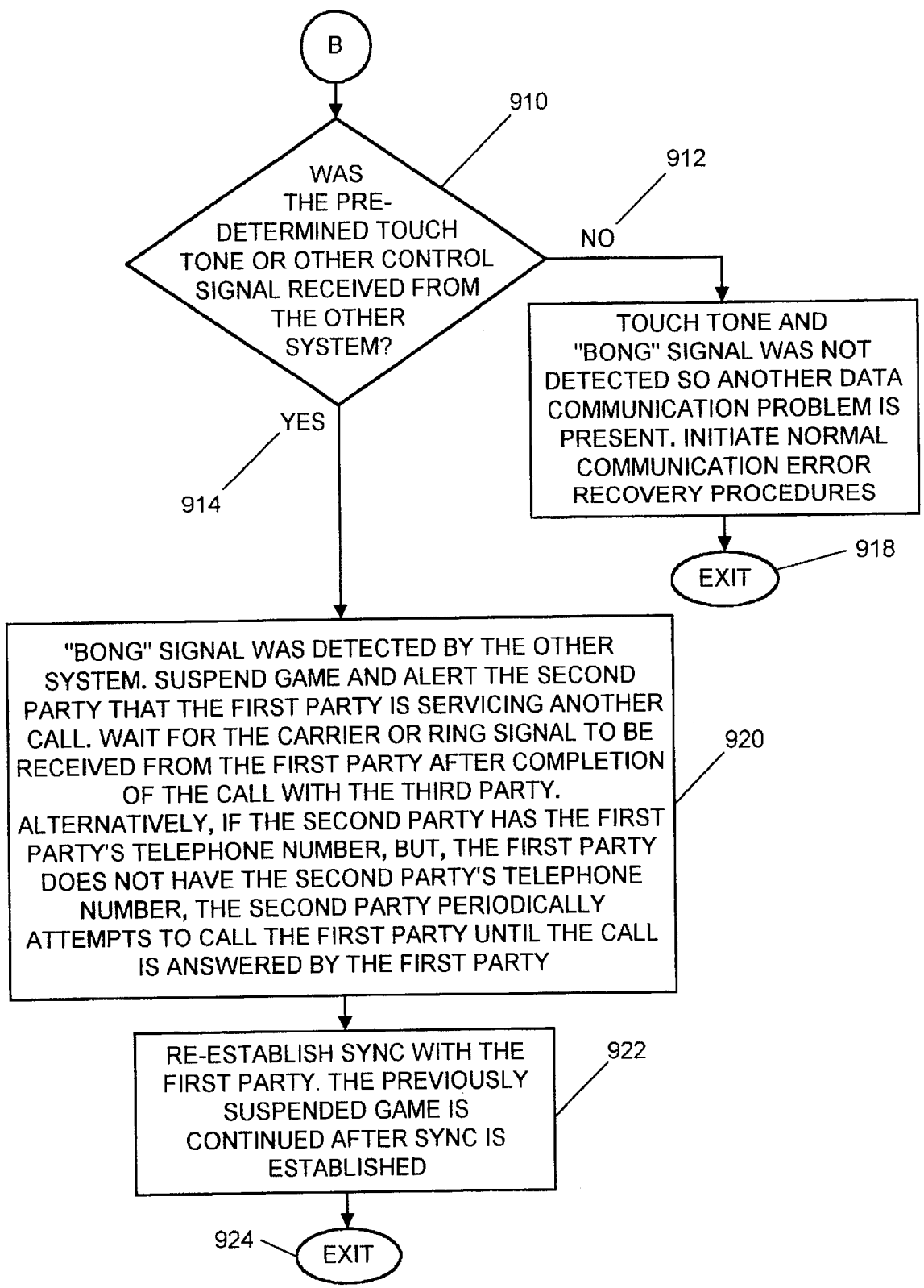

Referring now to FIG. 9, processing for the present invention continues at the bubble labeled B where a data communications error occurred but the "bong" signal was not detected on the telephone line 105. It may be the case that the "bong" signal was not received because the other system (i.e., the second party) is the one processing the data communication error. In that case, the second party will not hear the "bong" call waiting signal when the first party is called. However, when the first party system detects the "bong" signal, the first party sends a predetermined touch tone signal or other control signal to the second party as specified in processing block 612 illustrated in FIG. 6. Thus, if the "bong" signal is not detected on the telephone line 105, the telephone line 105 is checked for the presence of a predetermined touch tone or other control signal that may be received from the other system (decision block 910). If a predetermined touch tone or other control signal is received from the other system, processing path 914 is taken to processing block 920. In this case, the "bong" call waiting signal was detected by the other system. In this case, the game between the first party and the second party is suspended and an alert is sent to the second party notifying it that the first party is servicing another call. The second party then waits for the carrier or ring signal to be received from the first party after completion of the call between the first and the third party. In an alternative embodiment, if the second party has the first party's telephone number, but the first party does not have the second party's telephone number, the second party periodically attempts to call the first party until a call is answered by the first party (processing block 920). Eventually, the first party terminates its call with the third party and either initiates a call to the second party or waits for the second party to initiate a call to the first party. In either case, communication between the first party and the second party on telephone line 105 is reestablished (processing block 920). In processing block 922, synchronization with the first party is re-established using the mechanisms and techniques described above and in the above referenced co-pending patent applications. Once synchronization between the two systems is established, the previously suspended game is continued from where it left off when the third party call waiting disruption was received (processing block 922). Processing for the present invention then terminates through exit bubble 924 illustrated in FIG. 9.

On the other hand, in processing block 910, when the Bong signal and predetermined touch tone signal or other control signal is not detected, decision path 912 is taken to processing block 916. In processing block 916, it is determined that another data communication problem exist. As such, the first party initiates standard communication error recovery procedures and exits at bubble 918.

Thus, a means and method for detecting and recovering from call waiting interference to modem communications is described. These specific arrangements and methods described herein are merely illustrative of the principles of the present invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

We claim:

1. In a real-time video game environment including a first computer system participating in a real-time video game with a second computer system via a telephone line, a method comprising the steps of:

said first computer system detecting a call waiting signal on said telephone line during said real-time video game with said second computer system, said call waiting signal indicating a third party attempting to establish communication with a user of said first computer system via said telephone line;

in response to detecting said call waiting signal, said first computer system sending a predetermined touch tone signal to said second computer system, indicating that said real-time video game has been disrupted, said predetermined touch tone signal being selected from a set of touch tone signals exclusive of standard touch-tone telephone signals;

said first computer system suspending said real-time video game and terminating said communication with said second computer system; and said first computer system generating a prompt, wherein an activation of said prompt re-establishes communication with said second computer system and unsuspends said real-time video game.

2. The method of claim 1, wherein said predetermined touch tone signal is a Dual Tone Multi Frequency (DTMF) signal.

3. The method of claim 2, wherein said step of detecting said call waiting signal includes using a series of filters to determine if a spike signal is present on said telephone line at a predetermined frequency known to correspond to a call waiting signal.

4. The method of claim 3, wherein said prompt consists of an icon displayed on a display of said first computer system.

5. The method of claim 4, wherein said step of using said series of filters includes using two of said filters to determine if energy is present on either side of said predetermined frequency.

* * * * *